Sept. 12, 1967  R. W. BLACK  3,341,035
CARGO CENTERING DEVICE
Filed July 29, 1965  5 Sheets-Sheet 1

INVENTOR.
RICHARD W. BLACK
BY Harry M. Saragovitz,
Edward J. Kelly, Herbert Berl
& James W. Colvin
ATTORNEYS Sept. 12, 1967

R. W. BLACK 3,341,035

CARGO CENTERING DEVICE

Filed July 29, 1965

INVENTOR.
RICHARD W. BLACK
BY Harry M. Saragovitz,
Edward J. Kelly, Herbert Berl
& James W. Colvin
ATTORNEYS

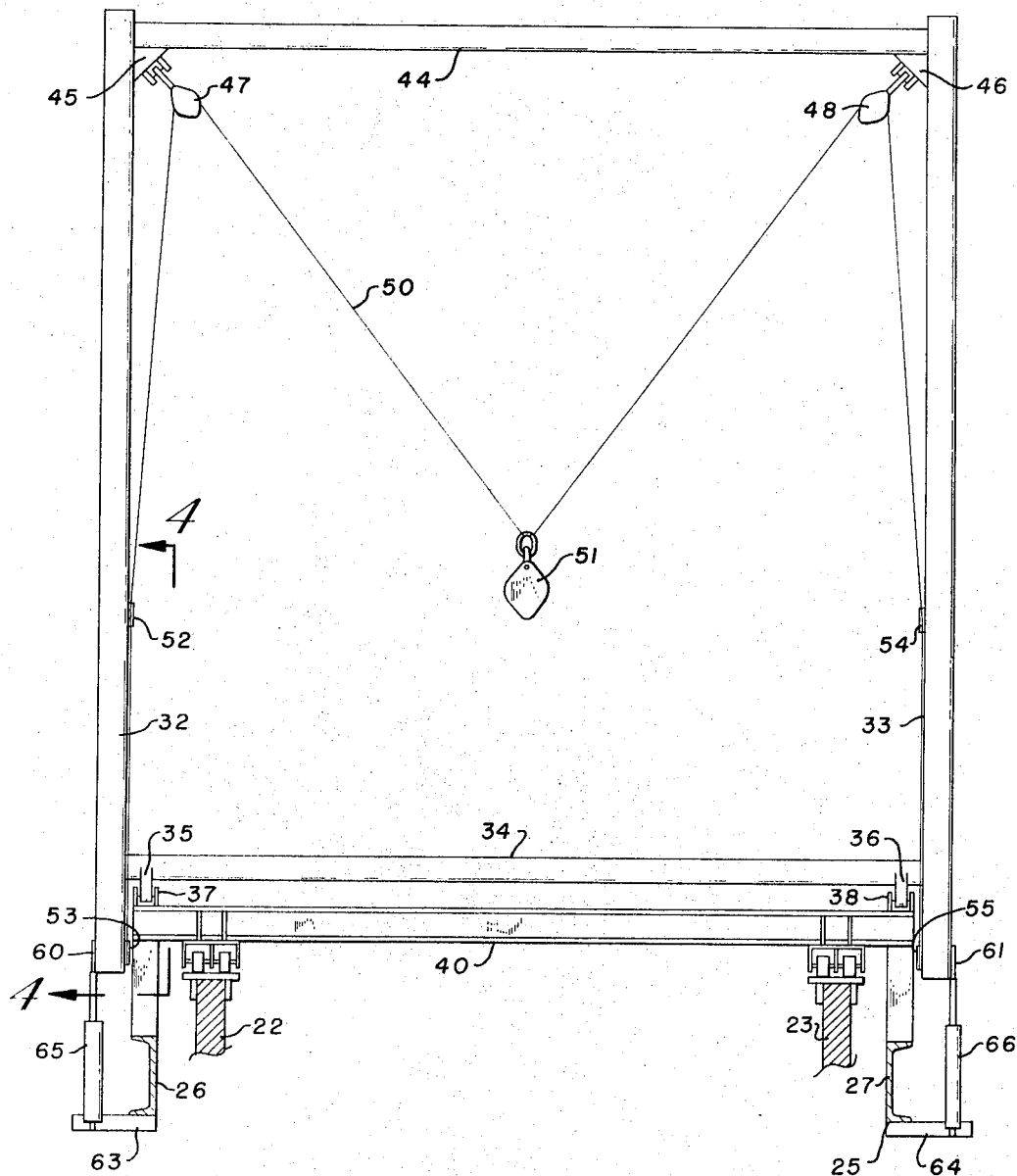

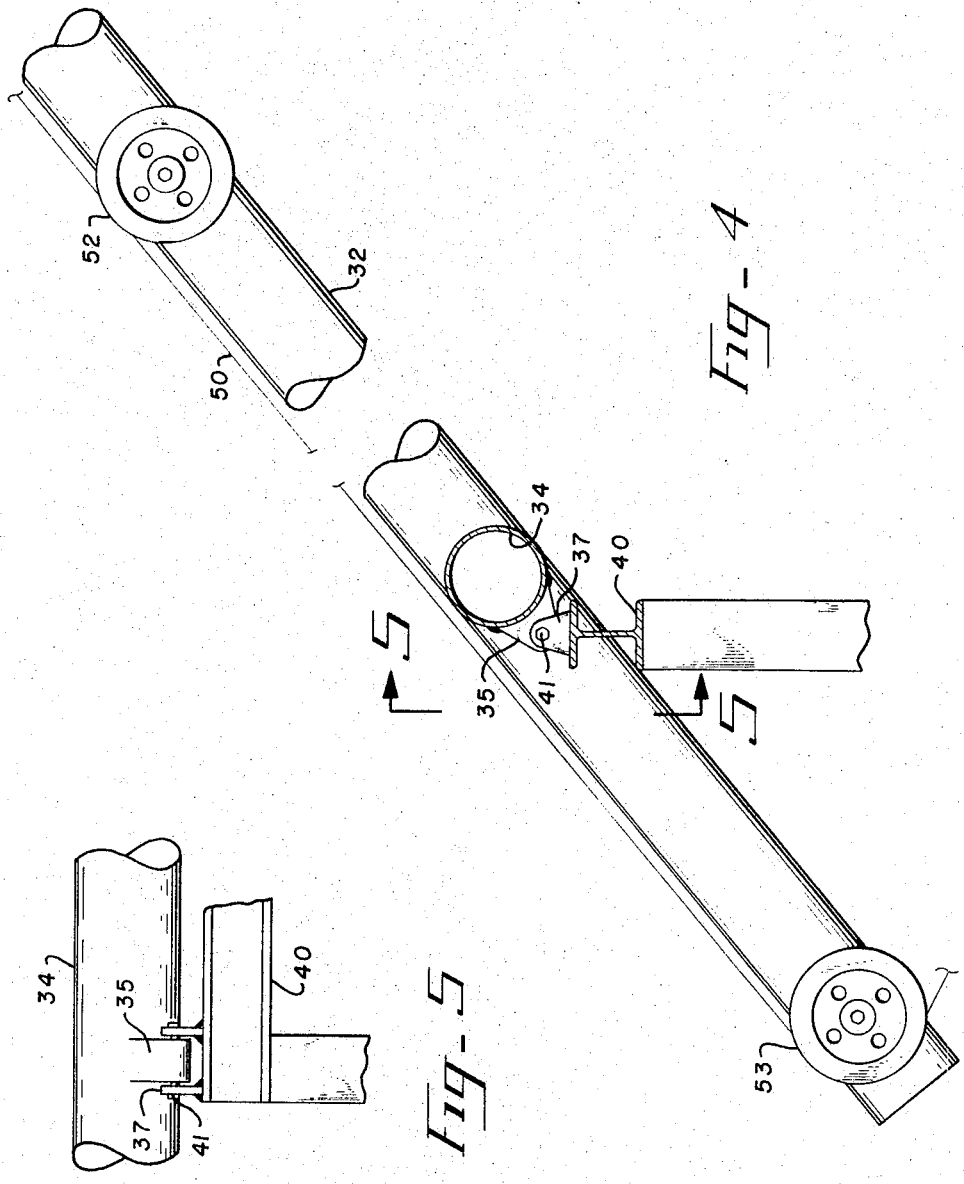

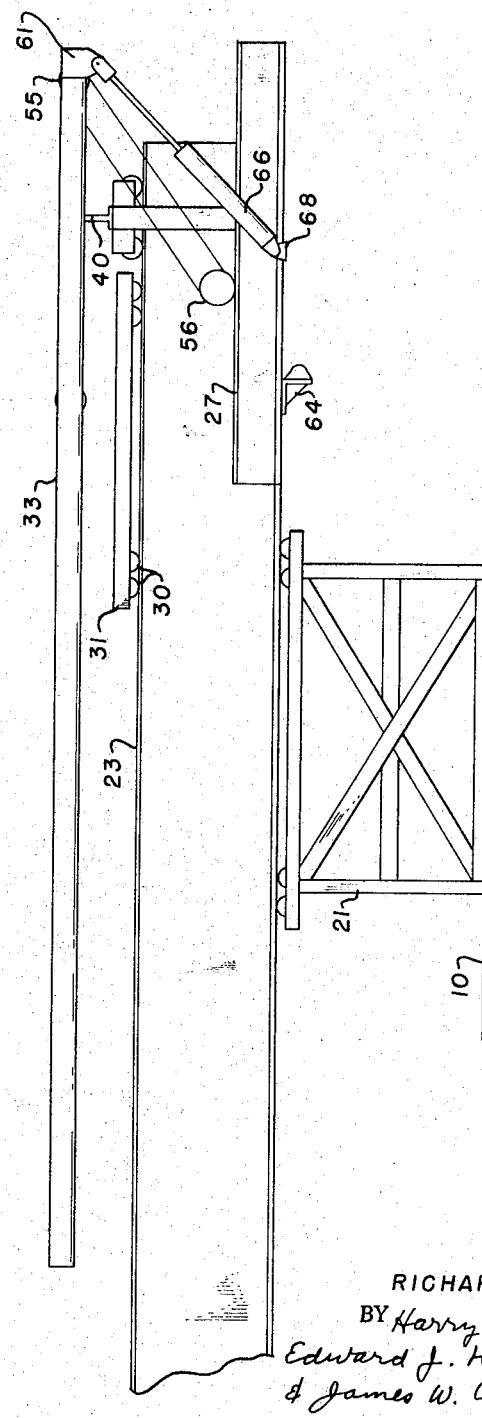

United States Patent Office 3,341,035
Patented Sept. 12, 1967

3,341,035
CARGO CENTERING DEVICE
Richard W. Black, Alexandria, Va., assignor to the United States of America as represented by the Secretary of the Army
Filed July 29, 1965, Ser. No. 475,904
6 Claims. (Cl. 214—15)

ABSTRACT OF THE DISCLOSURE

Power operated equipment is provided for lifting cargo from a ship's hold and centering it on a dolly nearby despite rolling and pitching of the ship. The dolly can then be rolled out on a ship's wing where the cargo is accessible for lift-off by a helicopter, shore crane, the ship's crane, another ship's crane or such.

---

The invention disclosed herein may be manufactured and used by or for the Government for governmental purposes without payment to me of any royalty thereon.

This invention relates to ship's cargo handling apparatus and has particular reference to a cantilever structure or wing mounted on a cargo ship and used to move cargo loads outboard of a ship to a location at which the cargo loads can be picked up by helicopters for movement of the cargo from the ship, as disclosed in patent application Serial Number 412,576, filed November 19, 1964 by Richard W. Black et al. for Portable Ships Wing for Cargo Transfer by Helicopter, now Patent No. 3,285,435, and more particularly to load centering apparatus for such a cargo wing.

In the use of the wing assembly disclosed in the above noted patent application, it was found that when a cargo load was raised from the ship's hold by the ship's cargo booms and hoisting gear, it was difficult to properly locate the cargo package on the wing dolly for movement from the hold to the outboard pick up station, particularly when the ship was undergoing rolling or pitching motion. During early testing of the outboard wing it was necessary to connect ropes to the cargo sling and use members of the ship's crew on these ropes to properly place the cargo loads on the dolly. This procedure not only required an excessive amount of manpower but subjected the operating personnel to unnecessary hazards. It was therefore necessary to solve this problem by the use of substantially automatic equipment.

It is therefore among the objects of the invention to provide in combination with a ship's wing assembly for transfer of cargo by helicopter, apparatus for controlling the placement of cargo loads on the wing dolly by the ship's hoisting gear so that each load is properly located on the dolly.

A further object resides in the provision of a cargo load centering device which is power operated to engage the falls of a ship's cargo hoisting gear and guide the falls to deposit a cargo load in a desired location.

A still further object resides in the provision with a ship's cargo wing including a trackway extending from a ship's hold to an outboard cargo pick up station and a dolly movable along said trackway between the ship's hold and the outboard station, and ship's hoisting gear including a boom and power operated falls for raising cargo from the hold to the cargo dolly, of a device mounted on the trackway of the wing and engageable with the hoisting gear falls to guide a cargo load to a properly centered position on the dolly as the load is lowered by the hoisting gear.

An additional object resides in the provision of a cargo centering device of the character indicated above which is power actuated and controlled by a single operator who also controls the operation of the dolly.

Yet another object resides in the provision of a cargo centering device of the character indicated which is of light weight and simple in construction and can be readily folded to an out-of-the-way position for storage of the wing.

Other objects and advantages will become apparent from a consideration of the following description and the appended claims in conjunction with the accompanying drawings wherein:

FIG. 3 is a cross-sectional view on an enlarged scale taken substantially on a plane indicated by the line 3—3 on FIG. 1;

FIG. 4 is a fragmentary cross-sectional view taken substantially on a plane indicated by the line 4—4 on FIG. 3;

FIG. 5 is a fragmentary cross-sectional view taken substantially on a plane indicated by the line 5—5 on FIG. 4; and, FIG. 6 is an elevational view similar to FIG. 1.

Figure 1:
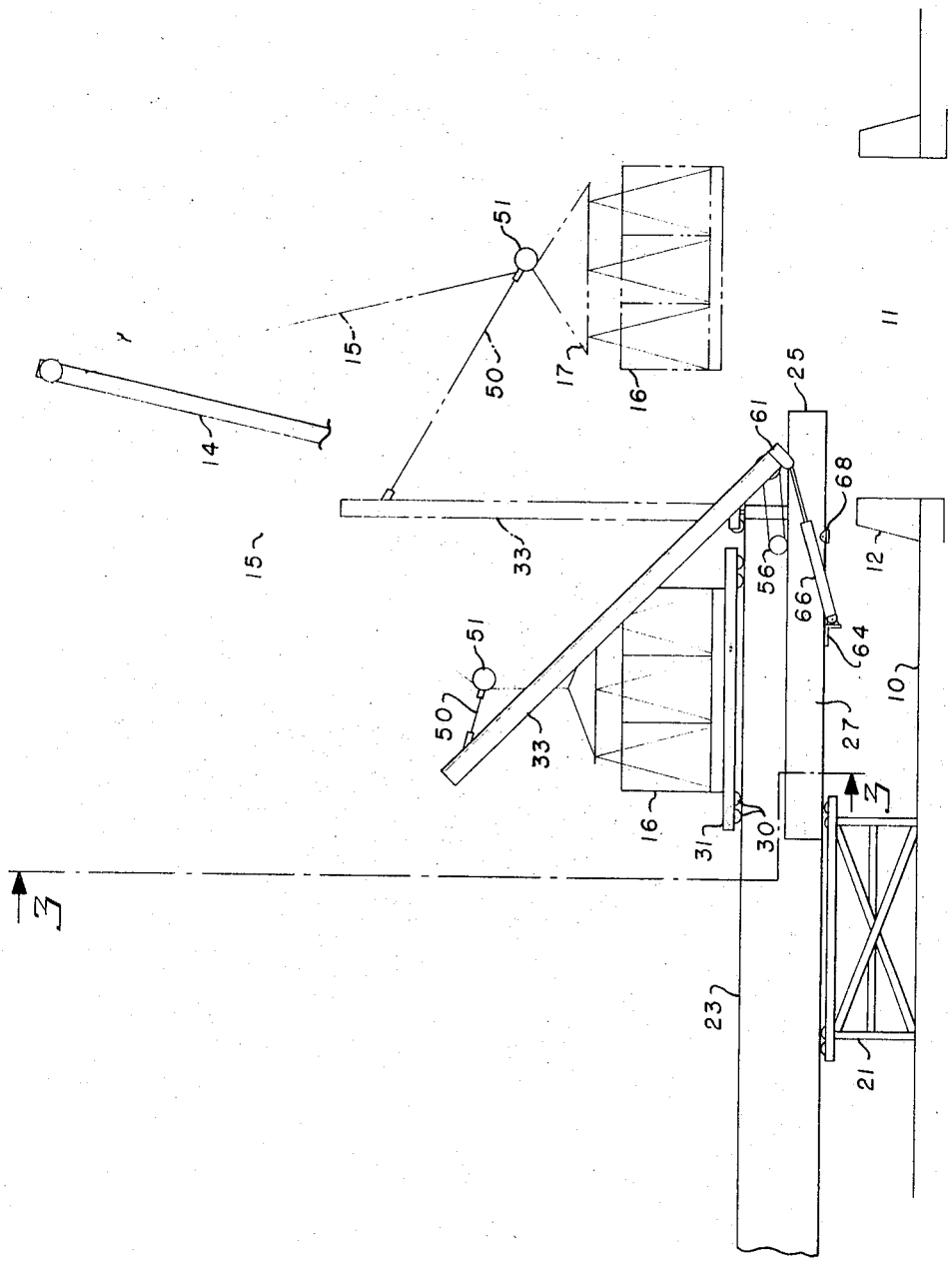
FIG. 1 is a somewhat diagrammatic elevational view of a portion of a ship's cargo wing with a cargo centering device mounted thereon.

With continued reference to the drawings and particularly to FIG. 1, the ship's deck is indicated at 10 and one of the hatchways at 11. The hatchway is surrounded by a hatch combing 12 and a hoisting gear is mounted on the ship and operable above the hatchway to lift cargo from the corresponding hold. This gear includes the usual booms, one of which is indicated at 14, the usual power operated winches, not illustrated, and a cargo fall 15 extending from a winch over a block secured at the upper end of the boom and into the hatchway. The illustration shows a palletized cargo load 16 supported by a cargo sling 17 secured to the lower end of the fall 15.

In operation the fall is pulled through the boom carried block to raise the cargo load from the hold and the boom is raised or lowered and swung as necessary to guide the cargo load to the location at which it is to be deposited. As the load is suspended by the fall from the upper end of the boom, the load will tend to swing when the ship rolls or pitches, particularly in open sea operation, rendering it difficult if not impossible to set the cargo load down on a preselected spot.

In the operation of off-loading cargo by helicopter a portable ship's wing is used to provide an outboard pick up station from which helicopters may pick up cargo loads without danger of interference with the superstructure of the ship. This portable wing comprises an elongated trackway 20 mounted on a support structure 21 which is, in turn, mounted on the deck 10 of the ship. The support structure includes a turntable so that the trackway can be swung through an angle of approximately 90 degrees between a stored position in which it extends longitudinally of the ship above the deck 10, and an operative position in which it extends outwardly from the side of the ship substantially perpendicular to the ship's longitudinal axis. In order to have the trackway extend a sufficient distance from the ship so that a helicopter can safely hover over the outer end of the trackway and still provide a convenient length for storage, the trackway is provided in two or more sections which are hinged or telescoped together. A roller bearing slideway may also be provided between the trackway and the support so that the inner end of the trackway can be properly positioned relative to the corresponding hatch opening. The trackway comprises hollow, rectangular beams, as indicated at 22 and 23, firmly held in spaced apart and parallel relationship by an intermediate framework.

The inner end of the trackway is disposed in a rectangular or U-shaped frame 25 which is secured to the support 21 and tied down to the hatch beam at the adjacent side of the hatch when the wing is in operative position. This frame comprises channel beams 26 and 27 disposed at the outer sides of the trackway beams 22 and 23, respectively, and have an engagement with the beams that renders them effective to hold the trackway in substantially horizontal position as it projects outwardly of the ship.

The top faces of the trackway beams provide tracks for the wheels or rollers 30 of a cargo dolly 31. This dolly moves along the trackway from one end of the wing to the other and normally receives cargo loads at the inner end of the wing and moves them to the outer end of the wing for helicopter pick up. Suitable power operated means, not illustrated, are provided for running the dolly back and forth along the wing and for swinging and folding and unfolding the wing.

Since it is desirable to operate the dolly at the maximum safe speed and since the wing has a large amplitude of movement in various directions because of the rolling and pitching movements of the associated ship, it is essential that each cargo load be carefully centered on the dolly before it is released from the hoist fall.

A semiautomatic centering device is provided for this purpose and comprises a pair of substantially parallel and coterminous spars 32 and 33 disposed at the outer sides of the frame beams 26 and 27, respectively, and secured near their lower ends to a cross bar 34. The cross bar is substantially perpendicular to the spars 32 and 33 and is provided near its opposite ends with downwardly extending, apertured lugs 35 and 36. These lugs are received in upwardly projecting brackets 37 and 38 mounted on a cross member 40 of the frame 25 and are pivotally connected to the brackets by suitable pins, as indicated at 41 in FIGS. 4 and 5. This permits the spars 32 and 33 to swing about the common axis of pivot pins 41 between the upright or operative position, shown in FIG. 1, and the prostrate or storage position shown in FIG. 6. An upper cross member 44 extends between the upper ends of the spars 32 and 33 and the structure is reinforced by triangular gussets 45 and 46 in the angles between this upper cross bar and the corresponding spars. Sheaves 47 and 48 are pivotally secured to the gussets 45 and 46, respectively, and are inclined inwardly and downwardly of the structure from the gussets. A cable 50 is run through sheaves 47 and 48 to form a loop or bridle and carries a third sheave 51 between sheaves 47 and 48. The end portions of the cable are trained over sheaves 52 and 53 rotatably supported at spaced apart locations on the inner side of spar 32 and sheaves 54 and 55 similiarly supported on spar 33. Sheaves 53 and 55 are near the lower ends of spars 32 and 33 and the cable end portions are also looped around sheaves, as indicated at 56 in FIG. 2, carried by suitable brackets secured to the frame beams 26 and 27. The cable ends are then secured in eye brackets, as indicated at 57, carried by the spars 32 and 33 below the pivot pins 41. This arrangement is such that the cable loop has a prescribed looseness when the spars are in upright position but is drawn substantially tight when the spars are in folded or storage position.

Figure 2:
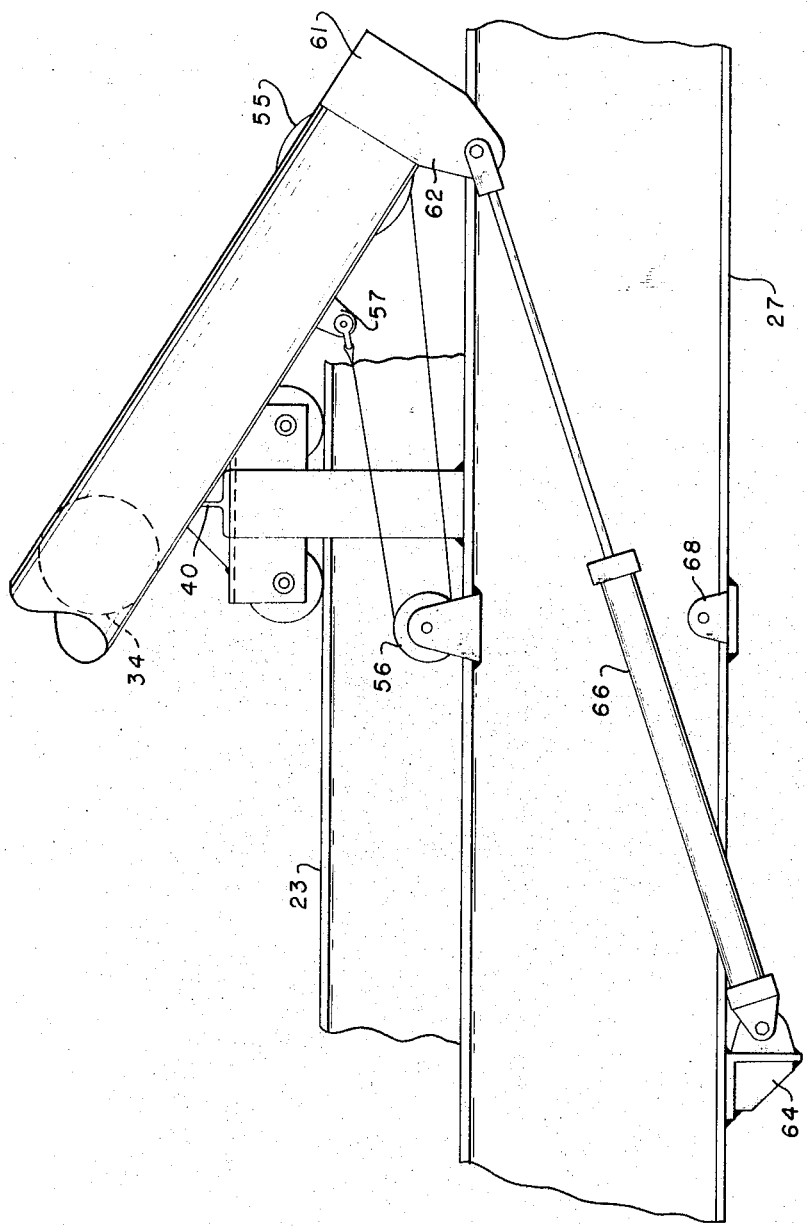
FIG. 2 is an elevational view on an enlarged scale of a fragmentary portion of the mechanism shown in FIG. 1.

Foot members 60 and 61 terminating rearwardly in apertured lugs, as indicated at 62 in FIG. 2, are secured on the lower ends of spars 32 and 33, respectively, and brackets 63 and 64 having inwardly projecting apertured lugs are mounted on the frame beams 26 and 27 outwardly of the cross member 40. An expansible chamber hydraulic device 65 is operatively connected between the bracket 63 and the foot 60 on spar 32. A similar expansible chamber hydraulic device 66 is connected between bracket 64 and the foot 61 on spar 33. Suitable hydraulic conduits connect the devices 65 and 66 with a hydraulic pump, not illustrated, and a manually controlled valve is interposed in the conduits for controlling movements of the spars 32 and 33 by controlling the application of hydraulic fluid under pressure to the devices 65 and 66. With this arrangement, the spars are held in generally upright position and are movable between the positions shown in full and dotted lines in FIG. 1.

In the use of the device with the spars in substantially upright position the fall 15 is run through the sheave 51 after which a cargo hook may be attached to the end of the fall. The hook is lowered into the ship's hold and connected to a cargo load, as by engaging the sling 17, and the hoisting gear is then operated to raise the load from the hold and to an elevated position such as is shown in broken lines in FIG. 1. The dolly 31 will now be at the inner end of the wing and between the parallel vertical planes in which the longitudinal center lines of the spars are disposed. The position of the cargo unit is now above the dolly and beyond the inner end of the wing. With the hoisting mechanism held against movement the hydraulic devices are now actuated to swing the spars from the broken line position to the full line position shown in FIG. 1, incidentally tightening the cable loop 50 to a limited extent. As the spar assembly is swung outwardly and the cable loop tightened, the fall 15 is brought into alignment with the longitudinal center line of the wing and the dolly. The portion of the fall below the sheave 51 and the cargo unit are also moved outwardly until the cargo unit is centered both longitudinally and laterally relative to the dolly. The hoisting gear is then operated to lower the cargo unit onto the dolly and the fall is then detached from the cargo unit. The dolly is then moved outwardly along the wing to the pick up station at the outer end of the wing and the spar assembly is swung back to the broken line position shown in FIG. 1 so that the fall can be lowered into the hold to pick up another cargo unit.

In order to move the wing to its stored position along the deck of the ship the cargo centering device must be lowered to an out-of-the-way position, as shown in FIG. 6. In order to accomplish this the hydraulic devices 65 and 66 are detached from the bracket eyes 63 and 64 and connected to auxiliary bracket eyes, one of which is shown at 68 in FIGS. 1, 2 and 6. These auxiliary bracket eyes are mounted on the frame beams 26 and 27 between the bracket eyes 63 and 64 and the inner end of the wing, the location being such as to permit the bottom ends of the spars 32 and 33 to move inwardly and upwardly to an extent such that, when the hydraulic devices 65 and 66 are fully extended the spars 32 and 33 are immediately above and substantially parallel to the wing beams or girders 22 and 23. The wing may now be folded or otherwise shortened and swung on the support 21 until it extends along the deck inwardly of the gunwale of the ship. When the wing is again placed in operation, it is necessary to first disconnect the hydraulic devices from the auxiliary bracket eyes, manually raise the free end of the spar assembly and reconnect the hydraulic devices to the bracket eyes 63 and 64 when the free end of the spar assembly has been raised a sufficient amount.

While a specific mechanical embodiment has been hereinabove described and illustrated in the accompanying drawings for the purpose of disclosing the invention, it is to be understood that the scope of the invention is not limited to the embodiment so described and illustrated but is commensurate with the scope of the appended claims.

I claim:
1. In combination with a ship's hatchway, ship's hoisting gear including a boom and a power operated fall suspended from the boom for raising cargo units from the ship's hold through the hatchway, and a ship's cargo wing including a track structure extending from the ship's hatchway outboard of the ship and a dolly movable back and forth along said track structure for transporting cargo from the hatchway to a station outboard of the ship, means for centering cargo units on said dolly comprising a spar structure straddling said track structure near the inner end of said wing, means fixed relative to said wing supporting said spar structure at its lower end for swinging movements about an axis perpendicular to the longi- tudinal center line of said wing, means carried by said spar structure at the upper end thereof engaging said fall, and power operated means connected to said spar structure for swinging the spar structure to move a cargo unit suspended from said fall at an elevation above said dolly to a position above said dolly and centered relative thereto.

2. In combination with a ship having a power operated hoisting gear including a boom and a fall suspended from said boom for raising cargo from the ship's hold through a selected hatchway and a ship's wing including a track structure secured to the ship and extending from the selected hatchway to a helicopter pick up station outboard of the ship, and a cargo carrying dolly movable along said track structure between said hatchway and said outboard pick up station, means for centering cargo loads relative to said dolly as the loads are placed on the dolly by the hoisting gear comprising a spar structure pivotally mounted near the inner end of the wing for swinging movements of its upper end longitudinally of the wing, means carried by said spar structure at the upper end thereof engaging said fall and effective to bring a cargo load suspended by said fall to a position above and centered both longitudinally and transversely relative to the dolly when the upper end of the spar structure is moved toward the outer end of the wing, and power operated means connected to said spar structure for swinging the spar structure about the pivotal mounting of the spar structure.

3. The arrangement set forth in claim 2 wherein said power operated means may be reset to free said spar structure to assume a storage position above and substantially parallel to said track structure.

4. The arrangement as set forth in claim 2 wherein said spar structure comprises a pair of substantially parallel and coterminous spars disposed outside of said track structure one at each side thereof and cross bars extending between said spars one near each end of said spar structure, and the cross bar at the lower end of said spar structure is pivotally mounted on said track structure for swinging movements of said spar structure longitudinally of said track structure.

5. The arrangement set forth in claim 2 wherein said power operated means comprises expansible chamber hydraulic devices connected between said track structure and said spar structure.

6. In combination with an elongated track structure, a cargo dolly movable back and forth along said track structure between a load receiving station and a load discharging station, and hoisting gear including a fall for lifting cargo loads and placing such cargo loads on said dolly when the dolly is at the load receiving station, means for centering cargo loads on said dolly comprising a spar structure mounted on and extending above said track structure for swinging movements longitudinally of the track structure, means carried by said spar structure and engaging said fall to pull a cargo load suspended by said fall above said dolly laterally into a centered position relative to said dolly when said spar structure is swung longitudinally in a predetermined direction to a predetermined extent, and power operated means connected between said track structure and said spar structure for swinging said spar structure.

References Cited

UNITED STATES PATENTS

| 584,187 | 6/1897 | McCabe et al. | 212—8 |
| 1,478,269 | 12/1923 | Travis | 214—38 |

ROBERT G. SHERIDAN, *Primary Examiner.*